United States Patent

McNally

[15] 3,635,439
[45] Jan. 18, 1972

[54] BALL VALVE

[72] Inventor: John D. McNally, 2714 Caulder, Des Moines, Iowa 50321

[22] Filed: Feb. 17, 1970

[21] Appl. No.: 12,030

[52] U.S. Cl. ........................................................251/315
[51] Int. Cl. ..........................................................F16k 5/06
[58] Field of Search..................251/315, 312, 309, 317, 214

[56] References Cited

UNITED STATES PATENTS

| | | | |
|---|---|---|---|
| 2,929,406 | 3/1960 | Anderson | 251/317 X |
| 3,428,089 | 2/1969 | Kachergis | 251/315 UX |
| 3,347,517 | 10/1967 | Scaramucci | 251/315 |
| 3,463,451 | 8/1969 | Treadwell | 251/315 |
| 3,323,542 | 6/1967 | Magos et al. | 251/315 X |
| 2,912,219 | 10/1959 | Clade | 251/315 |
| 2,981,284 | 4/1961 | Putnam | 251/317 X |
| 3,239,191 | 3/1966 | Widera | 251/214 X |
| 3,516,638 | 6/1970 | Piggott | 251/315 X |

Primary Examiner—Samuel Scott
Attorney—Morton S. Adler

[57] ABSTRACT

A two-way flow control ball valve device having an improved valve seat for an O-ring seal so that there is no binding or restriction on the movement of the ball under high pressures. Includes a housing having different diameter openings at opposite ends with the opening at the smaller end defining a fixed valve seat and a combined removable adapter plug and valve seat mountable in the larger end. The housing is designed for mounting of the ball valve so that the seal connection between the valve steam and the operating lever can be made from the outer side of the housing after the valve has been mounted therein.

5 Claims, 5 Drawing Figures

PATENTED JAN 18 1972 3,635,439
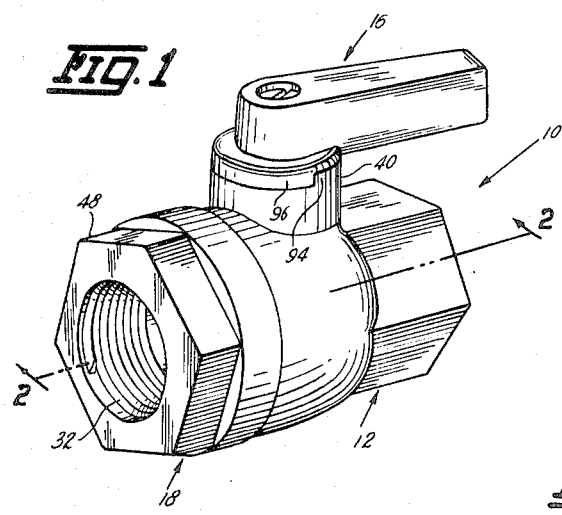
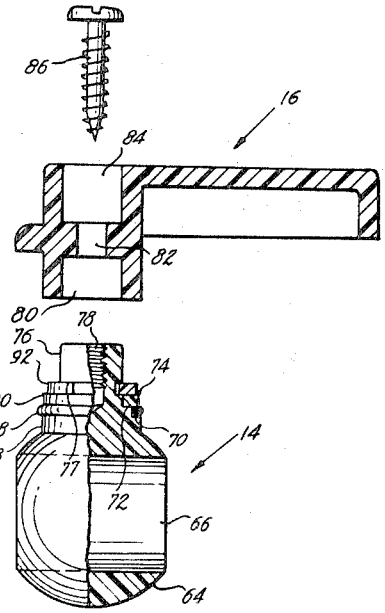
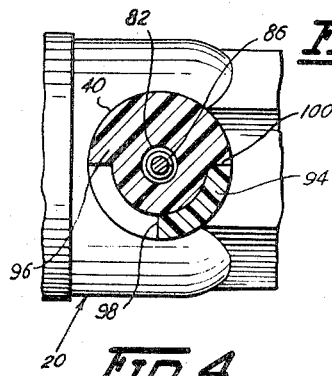
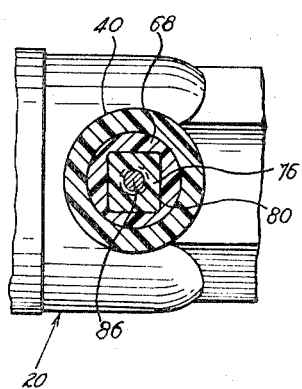
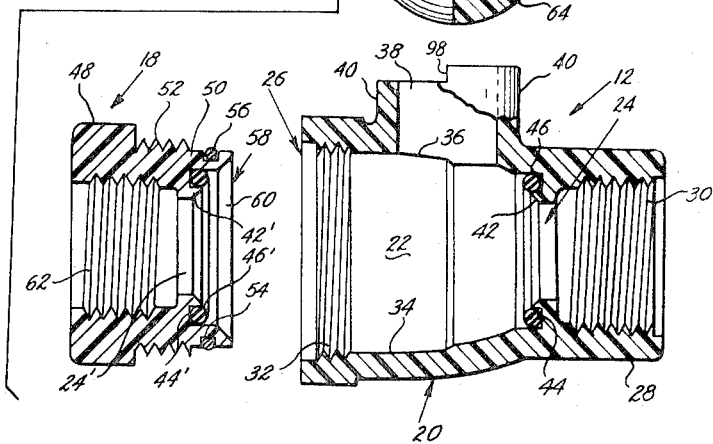
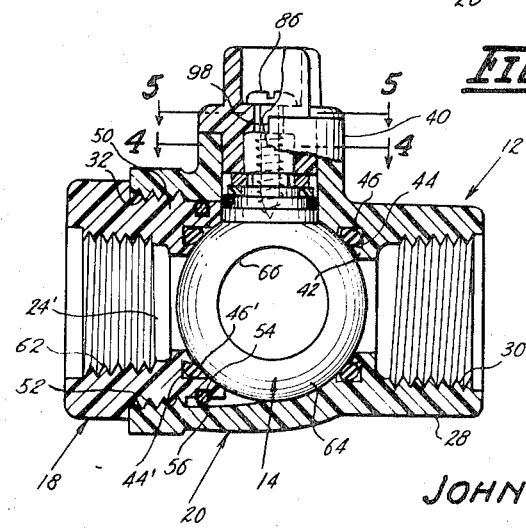
INVENTOR
JOHN D. MCNALLY
BY *Morton D. Adler*
ATTORNEY.

BALL VALVE

BACKGROUND OF THE INVENTION

This invention relates to improvements in ball valves.

The ease of operation of ball valves is frequently adversely affected by the binding of the ball against the sealing ring and particularly under high pressures where such valve may be forced into tight contact with the sealing ring. Accordingly, one of the important objects of the present invention is to provide an improved valve seat so that rotation of the ball valve relative thereto will not be subject to binding even under high pressures.

Another problem area in ball valves resides in effecting a proper sealing connection between the valve stem and the operating lever or handle. It is customary to apply appropriate sealing rings to the valve stem prior to the mounting of the ball valve within the housing and then to orient the stem relative to the housing opening through which the operating handle or lever will be attached. When this is done, it frequently occurs that the sealing ring on the stem becomes dislodged in positioning the stem into the housing opening so that when the operating lever is attached, the sealing connection at this point is not satisfactory. Accordingly, another important object of the present invention is to provide an improved seal mounting for the stem portion of a ball valve wherein such seal means is applied to the stem from outside of the housing and after the ball valve is properly mounted therein.

Another feature of the present invention is to provide a valve of this type that can effectively serve as a two-way flow control device.

Still a further object herein is to provide a valve of the above class which can be adapted for flow lines of different diameters and which includes a removable combination adapter plug and valve seat that can be suitably adjusted for the valve to operate satisfactorily under varying pressure.

SUMMARY

This invention includes a valve housing comprising an enlarged valve body portion having an integral projecting and internally threaded neck portion for attachment to a flow line. The end of the valve body portion adjacent the integral neck is provided with a flow port of fixed size and the opposite end of the body portion is substantially enlarged, internally threaded at the end portion and generally tapered from the enlarged end toward the flow port. The portion of the flow port within the valve body portion is provided with an improved valve seat design and the enlarged end of the body portion is designed to receive a removable combination adapter plug and valve seat which is threadably disposed in the larger end and is itself internally threaded for connection to a flow line. The diameter of the internally threaded opening in the plug may be made in different sizes for different size flow lines. The inner end of the adapter plug is provided with a valve seat of my improved design similar to the valve seat on the flow port at the other end and the ball valve operates between the two seats.

The body portion of the housing is provided with a side opening through which the valve stem on the ball valve is extended in the mounting of the valve and the seal connection between the valve stem and the operating lever is applied to the stem from outside of the housing after the ball valve is mounted therein.

The several objects of this invention together with the advantages of the same will be more fully described and developed in relation to the more detailed description of the accompanying drawings.

BRIEF DESCRIPTION OF THE DRAWINGS

FIG. 1 is a perspective view showing a preferred embodiment of this invention,

FIG. 2 is an exploded sectional view taken on the line 2—2 of FIG. 1,

FIG. 3 is a longitudinal sectional view of this valve showing the same in closed position, FIG. 4 is a cross-sectional view taken on the line 4—4 of FIG. 3, and FIG. 5 is a sectional view taken on the line 5—5 of FIG. 3.

DESCRIPTION OF THE PREFERRED EMBODIMENT

Referring to the drawings, this new valve is designated generally by the numeral 10 and as seen in the exploded view of FIG. 2, includes a valve housing 12, a ball valve 14, an operating handle or lever 16 and a combination adapter plug and valve seat 18. Housing 12 includes a ball valve body portion 20 defining a central chamber 22 which communicates at one end with a flow port 24 and at the opposite end with the opening 26 which is of substantially larger diameter than port 24. Body portion 12 includes the integral neck portion 28 which is adapted for connection to an appropriate flow line fitting and for this purpose has the internally threaded bore 30 in communication with flow port 24. The enlarged opening 26 on housing 12 is also internally threaded at 32 for a suitable distance and the wall portions of chamber 22 inwardly from threads 32 are tapered inwardly as at 34. A side opening 36 in housing 12 also communicates with chamber 22 to define a passageway 38 into the short, integral pipelike extension 40 to which the operating handle 16 is mounted as will later appear.

The edge of flow port 24 within the chamber 22 defines my improved valve seat arrangement and for this purpose, such edge is provided with the circumscribing bevelled bead or shoulder 42 which projects into chamber 22 whereby there is provided the channel-shaped groove 44 surrounding the bead or valve seat 42 which is adapted to receive an O-ring 46. The depth of channel 44 relative to the projected edge of seat 42 as seen in FIG. 2 is such that O-ring 46, when seated as described, will rest partly below such edge and partly above it. In this way, as will appear, O-ring 46 is properly positioned to provide an adequate seal against the ball valve and at the same time by reason of its mounting in channel 44 externally of the valve seat 42, the seat itself will serve as a stop or limit on the extent to which the valve can be pressed against the sealing ring under high pressures.

Plug 18 includes an outer hex-shaped cap 48 to facilitate its engagement by a suitable tool and has the shank portion 50 externally threaded in part as at 52 for threadable engagement with threads 32 in end 26 of housing 12. The outer end portion of shank 50 is provided with a circumscribing groove 54 to receive the O-ring 56 which provides a sealing engagement against the tapered walls 34 of chamber 22 when plug 18 is mounted to housing 12. The end 58 of plug 18 is provided with a recess 60 that communicates with a flow port, valve seat and O-ring arrangement similar to that previously referred to by numerals 24, 42, 44 and 46 and for which like parts are given like numerals primed. Port 24' communicates with the internally threaded bore 62 of plug 18 and it will be appreciated that within the limits of the diameter of such plug, the diameter of bore 62 can be made in various sizes to accommodate different diameter flow pipe fittings.

Ball valve 14 includes the ball member 64 having the through bore 66 corresponding in diameter to flow ports 24 and 24'. Integral with ball 64 and projecting therefrom is the valve stem 68 which includes a plurality of concentrically reduced stepped shoulders 70, 72 and 74 and terminates in end portion 76 which may be of any suitable shape for providing a keyed attachment to the operating lever or handle 16. For this purpose, I have preferably made end 76 generally rectangular and it is sufficiently larger than the diameter of stem 68 at the level of shoulder 74 to provide the shoulder 77. End 76 has an internally threaded bore 78 and on handle assembly 16 I have provided a socket portion 80 that is complementary in shape to end 76 for receiving the same. Such handle is also provided with a restricted passageway 82 communicating with a recess 84 oppositely disposed to socket 80 so that a suitable screw 86 can engage the treads 78 in an obvious manner. For use with stem 68, there is provided an O-ring 88 for shoulder 70, a washer member 90 for shoulder 72 and a snapring 92 intermediate shoulders 74 and 77.

As seen in FIGS. 1 and 5, the edge of extension 40 has a segmented shoulder portion 94 to cooperate with a complementary segmented shoulder portion 96 on handle 16 whereby the portion 40 includes the two stops 98 and 100 as best seen in FIG. 5 and thus limits the rotation of handle 16 to a quarter turn. The effect of this is to properly open and close the ball valve as will be described.

In assembling this ball valve, O-ring 46 is first placed in channel 44 as seen in FIG. 2. Ball 64 without the O-ring 88, washer 90 or snapring 92 is then inserted into chamber 22 through opening 26 so that stem 68 can be extended through opening 36 into position within the handle support portion 40. As this is done, it will be appreciated that since valve stem 68 has no displaceable components thereon to bear or scrape against the edges of opening 36, all danger of such components becoming dislodged from the positioning of valve stem 68 have been eliminated. This has previously been a problem area wherein premounted O-rings on valve stems of this type have become dislodged from their sealing position so that a satisfactory sealing connection with the operating handle did not result. In the present invention, after the ball valve is mounted as described, the O-ring 88, washer 90 and snapring 92 are mounted in the order indicated on the respective shoulders 70, 72 and 74. In this regard the snapring 92 is effectively locked in position by shoulder 77 on end portion 76. The relative depths of shoulders 70, 72 and 74 and relative thicknesses of members 88, 90 and 92 is such that O-ring 88 is firmly seated on stem 68 in effective sealing contact within passageway 38 of portion 40. Handle 16 is then attached to valve stem end 76 by means of the screw 86.

With the ball valve in place within housing 12, the combination adapter plug and valve seat 18 can be mounted to the large end 26 of housing 12. O-ring 56 will provide a fluid-type seal against walls 34 of chamber 22 as the plug is rotated and valve seat 42' will be oppositely disposed to and in axial alignment with valve seat 42. The degree of tightening of plug 18 as may be desired can be regulated by appropriate tools as is well known so that ball valve 64 will adequately seat against O-rings 46 and 46' and valve seats 42 and 42'. By this arrangement, it will be appreciated from the design of valve seats 42 and 42' that the ball valve will not compress the O-rings 46 and 46' to such a point where any binding or restriction on the movement of the valve will occur. This is due to the fact that such O-rings are seated outside of the valve seats and while they project above the seat so as to engage the ball and provide an adequate seal, any compression thereof by the ball valve is limited by the beads or valve seats 42 and 42' so that such rings cannot become fully compressed but retain sufficient resiliency to eliminate any binding or restriction on the movement of ball 64.

The internally threaded bore 62 of plug 18 can be made of varying diameters within the limits of the diameter of the plug and thus a single size plug member 82 can be economically fabricated and at the same time be adapted for connecting this valve assembly to different diameter fittings.

In open position, bore 66 of plug 64 will register with ports 24 and 24' and in closed position as seen in FIG. 3, ball 64 is rotated ninety degrees as limited by the handle assembly 16 described, to close both ports. It will thus be appreciated that this valve unit may be employed to control a flow from either of two directions.

From all of the foregoing, it is thought a full understanding of the construction and operation of this invention will be had and the advantages of the same will be appreciated.

I claim:

1. A ball valve, comprising:
   a housing having a valve chamber provided with oppositely disposed flow ports,
   a ball valve in said chamber operable relative to said flow ports,
   means to rotate said ball valve in two respective opposite directions between predetermined limits to place said flow ports into and out of flow communication,
   a valve seat on at least one of said flow ports within said chamber,
   said valve seat being an annular beadlike shoulder disposed to project into said chamber,
   said chamber being provided with a channel-shaped groove encircling said shoulder,
   an O-ring disposed in said groove so that the plane of one side of said O-ring extends into said chamber as an axial extension of said valve seat,
   said ball valve being normally in seating and sealing engagement only with said O-ring whereby if said ball valve is subjected to pressures tending to urge it against said O-ring so as to compress the same, said ball valve will move into engagement with said shoulder which serves as a stop means to limit the amount of such compression so that said ball valve can be rotated relative to said O-ring and shoulder without any binding effect,
   a handle lever support exteriorly of and integral with said housing and having a bore communicating with said chamber intermediate said flow ports,
   a valve stem on said ball valve disposed in the bore of said support,
   said valve stem being provided with a plurality of stepped concentrically reduced shoulders terminating in an enlarged end portion,
   an O-ring, washer and snapring successively mounted on said respective shoulders from exteriorly of said housing through said support,
   a manually operable lever operatively secured to said valve stem for rotating the same, and
   complementary stop means on said support and said lever to limit the rotation of said valve stem in two respective opposite directions.

2. A device as defined in claim 1 including:
   an adapter plug operatively fitted to said housing relative to said other flow port,
   seal means externally of one end of said plug for sealing engagement with the wall of said chamber,
   said one end of said plug being provided with a flow port and valve seat,
   said plug being provided with a bore in registration with the flow port therein and adapted for connection to a flow line,
   said valve seat on said plug being an annular shoulder disposed to project into said chamber,
   the valve seat end of said plug being provided with a channel-shaped groove encircling said shoulder,
   an O-ring disposed in said groove so that the plane of one side of said O-rings extends into said chamber as an axial extension of the valve seat on said plug, and
   said ball valve being normally in seating and sealing engagement only with said respective O-rings relative to the valve seat on said plug and the valve seat in the flow port of said housing whereby if said ball valve is subjected to pressures tending to urge it against either of said O-rings so as to compress the same, said ball valve will be moved into engagement with one of said shoulders which serves as a stop means to limit the amount of such compression so that said ball valve can be rotated relative to said O-ring and shoulder without any binding effect.

3. A ball valve, comprising:
   a housing having a valve chamber provided with oppositely disposed flow ports,
   a ball valve in said chamber operable relative to said flow ports,
   means to rotate said ball valve in two respective opposite directions to place said flow ports into and out of flow communication, said means comprising:
   a handle lever support exteriorly of and integral with said housing and having a bore communicating with said chamber intermediate said flow ports,
   a valve stem on said ball valve disposed in the bore of said support,
   said valve stem being provided with a plurality of stepped concentrically reduced shoulders terminating in an enlarged end portion, an O-ring, washer and snapring successively mounted on said respective shoulders from exteriorly of said housing through said support, a manually operable lever operatively secured to said valve stem for rotating the same, and complementary stop means on said support and said lever to limit the rotation of said valve stem in two respective opposite directions.

4. A ball valve, comprising:

a housing having a valve chamber, said chamber having different diameter openings at respective opposite ends with the smaller opening defining a flow port, an integral projecting neck on said housing having a bore in registration with said flow port and adapted for connection to a flow line, an adapter plug operatively fitted to said housing in the large end of said chamber, seal means externally of one end of said plug for sealing engagement with the wall of said chamber, said one end of said plug being provided with a flow port and valve seat in axial alignment with and spaced from said first-mentioned flow port, said plug being provided with a bore in registration with the flow port therein and adapted for connection to a flow line, a ball valve having a through bore disposed within said chamber so as to be operable relative to said flow ports, a handle lever support exteriorly of an integral with said housing and having a bore communicating with said chamber intermediate said flow ports, a valve stem on said ball valve disposed in the bore of said support, said valve stem being provided with a plurality of stepped concentrically reduced shoulders terminating in an enlarged end portion, an O-ring, washer and snapring successively mounted on said respective shoulders from exteriorly of said housing through said support, a manually operable lever operatively secured to said valve stem for rotating the same, and complementary stop means on said support and said lever to limit the rotation of said valve stem in two respective opposite directions.

5. A device as defined in claim 4 including:

said valve seat on said plug being an annular shoulder disposed to project into said chamber, the valve seat end of said plug being provided with a channel-shaped groove encircling said shoulder, an O-ring disposed in said groove so that the plane of one side of said O-rings extends further into said chamber than does said shoulder, and said ball valve being in sealing engagement with said O-ring whereby if said ball valve is subjected to pressures tending to urge it against said O-rings so as to compress the same, said shoulder serves as a stop means to limit the amount of such compression so that said ball valve can be rotated relative to said O-ring and shoulder without any binding effect.

* * * * *